Patented Aug. 2, 1932

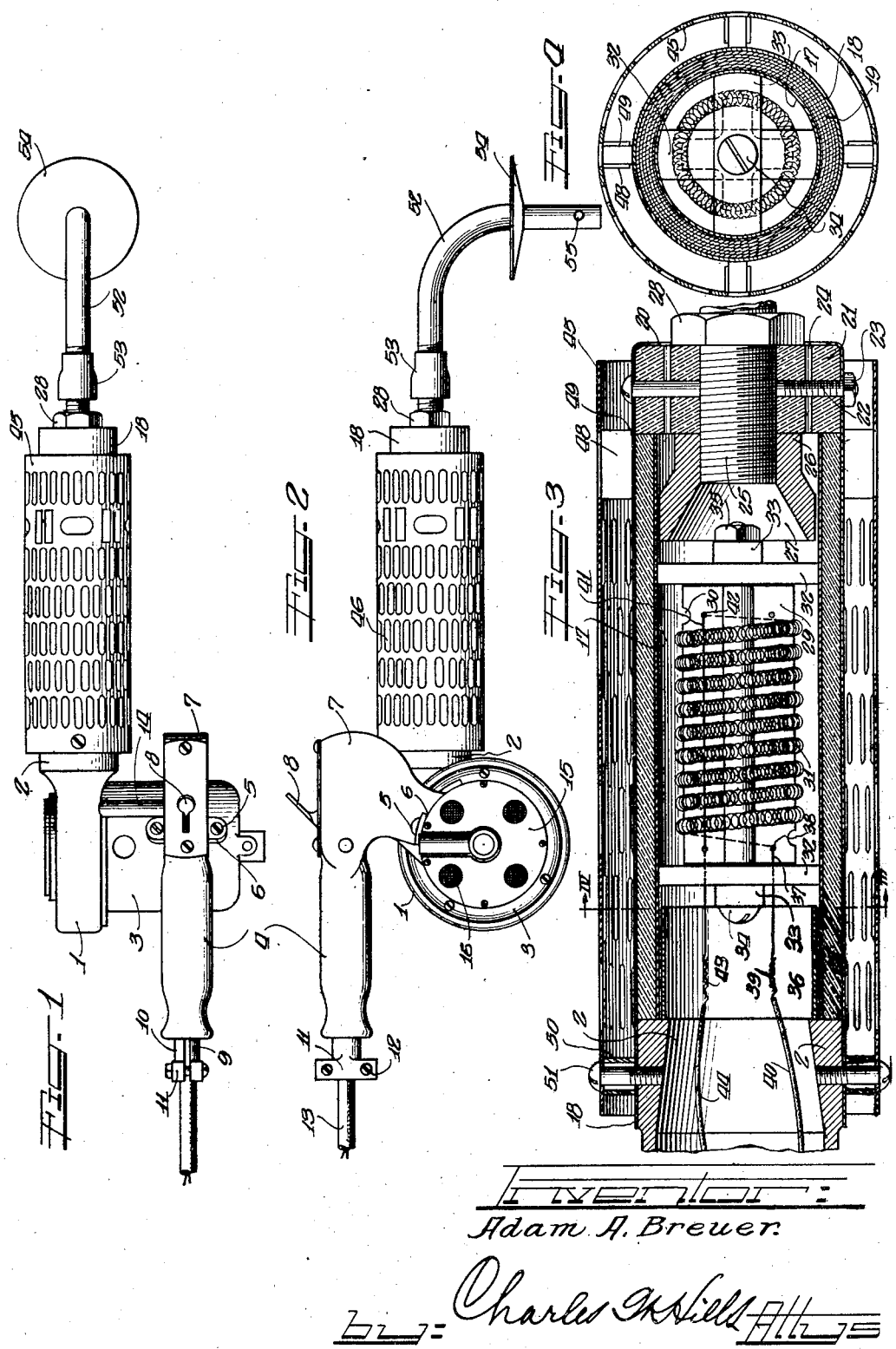

1,869,737

UNITED STATES PATENT OFFICE

ADAM A. BREUER, OF CHICAGO, ILLINOIS

PORTABLE HEAT BLOWER

Application filed December 31, 1930. Serial No. 505,764.

This invention relates to a portable heat blower and particularly to one having a hooked discharge nozzle for use in thawing solidified oils and greases in crank, transmission, and differential cases of motor vehicles and which blower is also useful for heating purposes as well as for thawing radiators of motor vehicles and the like.

The present invention has for its object the provision of a small, compact portable heat blower provided with a shield so that it may be grasped by the operator without injuring the operator's hands and furthermore, one which may be readily manufactured, assembled, and repaired at minimum cost.

Another object of this invention is to provide a portable heat blower having a discharge nozzle of restricted size with a lateral opening in the nozzle near its discharge end for allowing passage of heated air through the lateral opening in the event the discharge end is plugged with greasy matter, such passage of air melting the plugged matter and thus freeing the discharge end of the nozzle.

Another object of this invention is to provide a portable heat blower with a cylindrical heating chamber containing the heating element, and wherein the heating element is maintained in the heating chamber by reason of the arrangement of parts and also by telescopic engagement with the outlet of the fan casing, together with a shield about the heating chamber, the shield and chamber being secured to the outlet of the fan casing by a common means.

A further object of this invention is to provide a portable heat blower having a heating chamber at the discharge end of which there is provided a bell-like outlet member whereby the air heated in said chamber is discharged therefrom without appreciable loss and concentrated in a stream which in size is much less than the size of the heating chamber.

A still further object of this invention is to provide a portable heat blower with the parts so constructed and related as to enable ready assembly, disassembly, repair, and replacement.

The above, other, and further objects of the invention will be apparent from the following description, accompanying drawing and appended claims.

An embodiment of the invention is illustrated in the accompanying drawing and the views thereof are as follows:

Figure 1 is a top plan view of a portable heat blower embodying the present invention.

Figure 2 is a side elevation.

Figure 3 is a longitudinal vertical section taken through the heating chamber of the illustrated embodiment of the invention and showing details of construction and arrangement of parts.

Figure 4 is a transverse section taken substantially in the plane of line IV—IV of Figure 3.

The drawing will now be explained.

The form of apparatus chosen to exemplify the present invention consists of a portable fan casing 1 having a tangential outlet port or neck 2 the interior of which converges towards its end.

A motor casing 3 is suitably fastened to the fan casing 1 so that the motor shaft may be connected to the fan (not shown) for driving the same.

A handle 4 is fastened to the motor casing 3 by means of screws 5 passing through lugs 6 engaging threaded holes in the motor casing.

The fan casing 1, the motor casing 3, and the handle 4 are made of light material such, for example, as aluminum, so that the completed structure may be as light as possible for convenience in use and yet at the same time strong enough to withstand severe service.

Cast integrally with the handle 4 is a compartment 7 within which a switch is disposed for controlling the motor and heating element of the blower. The switch is actuated by a thumb or finger latch 8. The other end of the handle is provided with spaced transversely curved semi-circular members 9 and 10 each of which terminates in a head 11 through which pass bolts 12 for tightening said members about the cable 13 for supplying current to the motor and heating element of the blower. The members 9 and 10 constitute strain relief means for the cable.

A connection 14 is made between the box 7 and the fan casing 1 through which pass conductors to the heating element from the box 7.

The end of the motor casing 3 remote from the fan casing 1 is provided with apertures 15 for ventilating purposes, which apertures are fitted with screens 16 which exclude dirt.

The heating chamber, in the present apparatus, includes an inner cylindrical shell 17, an outer cylindrical shell 18, which shells are concentrically arranged and spaced by a filler 19 of suitable heat insulating material. The inner shell 17 is of less length than the outer shell 18. One end of the outer shell 18, that is, the front end, is inturned forming an end flange 20, while the other end of the shell 18 is cylindrical and engages over the outer surface of the neck or outlet 2 of the fan casing.

A plug 21 of insulating material is inserted in the front end of the heating chamber and held in place by a bolt or like means 22 passing through the outer casing 18, the plug 21, and projecting from the casing 18, where, in the present instance, it is secured by a nut 23. The plug 21 is provided with axially disposed holes 24 of small size for the passage of a small quantity of air. The plug 21 is provided with an axial opening for the reception of a nipple 25 which is threaded on its outside and which is supported in the plug 21 by the bolt 22, which bolt likewise passes through the nipple. The nipple extends beyond the side surfaces of the plug 21.

Threaded on to the inside end of the nipple 25 is a cup nut 26 having a flared or bell-mouthed end 27. A nut 28 threaded onto the outer end of the nipple 25 cooperates with the cup nut 26 to make tight connection with the plug 21.

The heating element in the present instance includes a core of suitable insulating material such as porcelain or the like which preferably is cruciform in end elevation and which is provided along its exterior with a plurality of notches 30 for receiving the spirally wound turns of the resistance element 31.

At each end of the core 29 cross legs 32 and 33 are secured by means of a bolt 34 extending through the core 29 and the legs and secured by means of a nut 35. The legs of each pair are arranged at right angles to each other and in length are substantially that of the inner diameter of the inner shell 17 of the heating chamber.

The heating element consisting of the core 29 and the legs 32 and 33 rests with one of the legs against the mouth of the flared nut 26 and is maintained threagainst by a spacer 36 engaging one of the legs at the other end of the heating element, and when the heating chamber is assembled on the neck 2 of the casing, the spacer abuts the end of such neck. It will be observed, therefore, that the heating element is maintained within the heating chamber by endwise engagement with the nut 26 and the spacer 36 and may be readily removed when the heating chamber is removed from the fan casing.

An end 37 of the resistance coil 31 is led through a hole 38 in the core 29 where it is connected at 39 to a conductor 40 leading from the switch box 7 of the handle 4. The other end 41 of the resistance coil 31 passes through a hole 42 in the core 29, thence is led rearwardly and connected at 43 to a conductor 44 leading to the switch box 7.

The heating chamber is removably associated with the neck or outlet 2 from the fan casing for repair and replacement and also for easy assembly in the first instance.

The heating element is assembled by forming the resistance coil 31 about the core 29 leading the ends 37 and 41 of the resistance coil through holes in the core, then applying the legs 32 and 33 to the ends of the core 29 and securing the legs in position by the bolt 34. The ends of the resistance coil are then fastened to the conductors 40 and 41, after the spacer 36 has been assembled which is done by connecting the ends of the wires of the resistance element to the conductors through the spacer, or providing a slot in the spacer and slipping it over these wires when connected.

The heating chamber consisting of the inner and outer casings 17 and 18 and the end plug 21, together with the nipple 25 and nut 26, is previously assembled and then applied over the heating element and spacer 36 surrounding the heating element and spacer with the rear end tied over the neck 2 of the blower. The heating chamber is pushed against the end of the neck so that endwise pressure, that is, axial pressure, is brought to bear on the heating element by the cup nut 26 at one end and the spacer 36 at the other end.

A shield cylindrical in form and perforated with a plurality of oblong perforations 46 is applied over the heating chamber. The diameter of the shield 45 is greater than the diameter of the outer casing 18 of the heating chamber so as to be spaced therefrom when the parts are assembled.

The shield is provided with bearing seats 47 formed, in the present instance, by bending inwardly of the surface of the shield portions 48 and 49 and inserting therebetween material such as asbestos for resting against the outer casing 18 of the heating chamber. There are sufficient numbers of the spacers 47 just described to support the outer end of the shield 45 in spaced relation to the outer casing 18 of the heating chamber.

Bushings 50 are interposed between the outer casing 18 and the shield 45 for the reception of screws 51 which pass through registering apertures in the shield 45 and the outer casing 18 and are threaded into apertures in the neck 2 of the fan outlet. The bushings 50 space the inner end of the shield 45 from the outer casing 18 so that there is formed a spaced shield about the heating chamber having perforations therein so that the heat dissipated from the heating chamber through the walls thereof may be readily dissipated to the atmosphere without damaging or hurting the hands of the operator who usually holds the blower by grasping the perforated shield 45.

A nozzle shown in the present instance as a curved pipe 52 is connected to the outer end of the nipple 25 by means of an adapter 53. A shield 54 is slidable along the nozzle 52. The position of the shield determines the extent to which the free end of the nozzle projects into a transmission or differential case for thawing the lubricant.

The nozzle 52 is provided with a lateral hole 55 positioned inwardly from its free end. This hole is provided for the passage of heated air through the hole when the end of the nozzle becomes clogged, as it often does in service, with the lubricant. Passage of heated air through the nozzle when the end is clogged, with the air escaping through the hole 55, enables melting of the clogged lubricant in the end of the nozzle.

The position of the handle 4 is substantially parallel to the axis of the heating chamber and, as readily apparent, is secured to the motor casing at one side of the heating chamber. It has been found that when the blower of the present invention is utilized to hang into the escape opening of a differential or transmission case, the straight handle is easier to grasp while using the blower in such manner.

The provision of the cup nut 26 assures that all of the air heated in the heating chamber passes from the chamber through the nipple, thence through the nozzle, allows escape of a little, if any, of such heated air. The provision of the holes 24 in the end plug allows escape of such heated air as is not collected by the bell-mouthed nut 26.

The motor and heating element are electrically connected in such manner that one will not operate without the other, as fully described in Patent No. 1,777,744 issued October 7th, 1930. The present invention covers improvements on the subject-matter of such Letters Patent.

The operation of the blower is as follows:

Should it be desired to thaw out the lubricant in the differential case of a motor vehicle, the drain plug is removed and the end of the nozzle 55 inserted with the plate 54 adjusted to properly support the blower in hanging position from such drain opening. The switch latch 8 is then actuated to operate the fan motor and heating element. Hot air is then discharged from the nozzle 52 into the differential case and such discharge continuing until such time as the differential lubricant is sufficiently fluid to readily run out from the case.

The fan drives the air past the heating element and heating element heats such air, the heated air being discharged at high velocity from the nozzle. The bell-mouth of the nut 26 causes the heated air to enter the nipple 25 increasing the velocity of the discharged air by reason of the reduction of the area of the nozzle with respect to the heating chamber.

The provision of the perforated shield 45 has been found very advantageous as it is sufficiently cool to enable the operator to grasp it with his bare hands in use of the blower so equipped.

It will be observed that the perforations of the shield 45 are elongated holes, thus increasing the dissipation of the heat from the heating chamber through the sides thereof and also increasing air circulation between the shield 45 and the heating chamber.

The provision of the strain relief for the cable 13 where it enters the handle 4 prolongs the life of the cable as it prevents undue bending and wear of the cable at this point.

Should it be desired to disassemble the heating chamber, then the screws 51 would be withdrawn, the bushings 50 removed, and the casing 45 slid endwise over the heating chamber, whereupon after the screws 41 are removed, the heating chamber may be pulled off of the neck 2 of the discharge outlet of the fan casing. Removal of the heating chamber from the outlet 2 separates the chamber and heating element, as the heating element is connected to the conductors 40 and 44 so that ready removal or repair may be made and the parts re-assembled in reverse order.

The invention has been described herein more or less precisely as to details, yet it is to be understood that the invention is not to be limited thereby as changes may be made in the arrangement and proportions of parts, and that equivalents may be substituted without departing from the spirit and scope of the invention.

The invention is claimed as follows:

1. A portable heat blower having a discharge nozzle of bent tubular form for insertion in solidified greases, oils, and the like, said blower including a heating chamber having a discharge outlet, and a tubular nozzle connected to said outlet for insertion in solidified grease and the like, the nozzle being provided with a lateral opening rearwardly of the discharge end of the same for permitting air discharge when the end is clogged.

2. A portable hot air blower including in combination a fan, a heating chamber, and a discharge outlet, and a shell having a plurality of elongated openings therein positioned about said chamber intermediate the fan and the outlet, and portions of said shell being inturned to provide spacers for supporting said shell in spaced relation to said chamber.

3. A heat blower including a motor and a fan casing, a heating chamber removably connected to the outlet of the fan casing, said chamber having a plug in its discharge end, said plug having an axial opening therethrough and a smaller opening therethrough extending from face to face of said plug for air escape.

4. A heat blower including a motor and fan casing, heating chamber member removably connected at one end to the outlet of said fan casing, a plug in the other end of said chamber, said plug having an axial opening therethrough and a nipple extending through said opening, and a single member passing through the plug and nipple and engaging the chamber to retain said plug and nipple in position.

5. A heat blower including a motor and a fan casing, a heating chamber member removably connected by one end to the outlet of said fan casing, the other end of said heating chamber having a plug therein, said plug having an axial opening therethrough, a nipple secured in said axial opening, a cup nut on said nipple inwardly of the chamber, a heating element within said chamber, said heating element bearing against the end of the cup nut when the parts are assembled for spacing said heating element from said plug, said cup nut serving to direct air into said nipple, and a nozzle secured to the outer end of said nipple.

6. A heat blower including a motor casing and a fan casing, a heating chamber member removably connected by one end to the outlet of said fan casing, a shield member surrounding said heating chamber and spaced therefrom and connected at one end to the outlet of said fan casing, said shield being spaced from said heating chamber at the opposite end by portions of said shield struck inwardly towards the heating chamber member.

7. A heat blower including a motor and a fan casing, a heating chamber removably connected to the outlet of the fan casing, said chamber having a plug in its discharge end, said plug having an axial opening therethrough, and a discharge tube carried by said plug and communicating with said opening.

8. A heat blower including a motor and fan casing, a heating chamber member removably connected at one end to the outlet of said fan casing, a plug in the other end of said chamber, said plug having an axial opening therethrough and a nipple extending through said opening, and a single member engaging said plug and said chamber to retain said plug and nipple in position.

In testimony whereof, I have hereunto subscribed my name at Chicago, Cook County, Illinois.

ADAM A. BREUER.